(12) United States Patent
Willcox et al.

(10) Patent No.: US 12,455,261 B2
(45) Date of Patent: Oct. 28, 2025

(54) PHOTOIONIZATION DETECTOR HAVING IMPROVED GAIN AND REDUCED HUMIDITY SENSITIVITY

(71) Applicant: Mocon, Inc., Brookyln Park, MN (US)

(72) Inventors: Charles R. Willcox, Hopkins, MN (US); David J. Jennings, Edina, MN (US); Christopher T. Fields, Coon Rapids, MN (US)

(73) Assignee: MOCON, INC., Brooklyn Park, MN (US)

( * ) Notice: Subject to any disclaimer, the term of this patent is extended or adjusted under 35 U.S.C. 154(b) by 285 days.

(21) Appl. No.: 18/478,046

(22) Filed: Sep. 29, 2023

(65) Prior Publication Data

US 2024/0295529 A1 Sep. 5, 2024

Related U.S. Application Data

(63) Continuation-in-part of application No. 18/473,539, filed on Sep. 25, 2023, which is a continuation-in-part (Continued)

(51) Int. Cl.
*G01N 27/66* (2006.01)
*G01N 33/00* (2006.01)
*H01J 47/02* (2006.01)

(52) U.S. Cl.
CPC ......... *G01N 27/66* (2013.01); *G01N 33/0047* (2013.01); *H01J 47/02* (2013.01)

(58) Field of Classification Search
CPC ................................ H01J 47/02; G01N 27/66
See application file for complete search history.

(56) References Cited

U.S. PATENT DOCUMENTS 7,046,012 B2   5/2006  Dean et al.
11,037,778 B1  6/2021  Dolgov et al.
(Continued)

FOREIGN PATENT DOCUMENTS

CN   114235942 A   3/2022
EP      3559649    10/2019

OTHER PUBLICATIONS

Ametek Mocon, piD-TECH eVx Photoionization Sensors, https://www.ametekmocon.com/products/oemphotoionization/pidtechevxphotoionizationdetector, accessed May 15, 2023.
(Continued)

*Primary Examiner* — Casey Bryant
(74) *Attorney, Agent, or Firm* — GRUMBLES LAW PLLC; Brittany Haanan (57) ABSTRACT

A photoionization detector comprised of a gas discharge lamp that ionizes molecules of interest to create ionized molecules and electrons and a sensor having at least one opening for UV light to pass through and electrically conductive patterns on at least one of the top and bottom surfaces of the plate, including at least a negative electrical potential pattern and an electron collecting electrode pattern. The ionized molecules are collectable by a bias electrode and electrons are collectable by a collector electrode. The negative electrical potential pattern includes a linear portion and a polarization plate. The electron collecting electrode pattern includes a wire suspended across the at least one opening and a linear portion on the surface opposite the wire. The electrically conductive patterns can further include a grounded potential conductive pattern having a first portion on the top surface and a second portion on the bottom surface.

20 Claims, 6 Drawing Sheets

Related U.S. Application Data of application No. 18/176,624, filed on Mar. 1, 2023, now Pat. No. 12,146,854.

(56) References Cited

U.S. PATENT DOCUMENTS

| | | | | |
|---|---|---|---|---|
| 12,146,854 | B2* | 11/2024 | Willcox | G01N 27/64 |
| 2003/0075679 | A1 | 4/2003 | Syage et al. | |
| 2003/0137306 | A1 | 7/2003 | Dolgov et al. | |
| 2015/0130473 | A1 | 5/2015 | Agah et al. | |
| 2020/0333292 | A1* | 10/2020 | Su | G01N 27/62 |
| 2022/0187245 | A1 | 6/2022 | Xu et al. | |
| 2023/0176011 | A1* | 6/2023 | Lee | G01N 27/66 |
| 2023/0194474 | A1 | 6/2023 | Xu et al. | |
| 2024/0295528 | A1 | 9/2024 | Willcox et al. | |
| 2024/0295529 | A1* | 9/2024 | Willcox | G01N 27/66 |
| 2024/0297034 | A1* | 9/2024 | Willcox | H01J 61/0672 |

OTHER PUBLICATIONS

Ametek Mocon, piD-TECH eVx User Manual 143-175 Rev 1.1, pp. 1-21.

European Search Report pertaining to corresponding European Patent Application No. 23164049.1, dated Oct. 2, 2023.

Ion Science Ltd., MiniPID 2 (3PIN) Manual, Unrivalled Gas Detection, pp. 1-32.

Rae Systems by Honeywell, The PID Handbook—Theory and Applications of Direct-Reading Photoionzation Detectors (PID), www.raesystems.com.

Tektronix, Keithley, "Low Level Measurements Handbook—7th Edition. Precision DC Current, Voltage, and Resistance Measurements".

Notice of Allowance pertaining to U.S. Appl. No. 18/473,539, mailed Aug. 5, 2025.

Notice of Allowance for U.S. Appl. No. 18/176,624, mailed Sep. 28, 2024.

Extended European Search Report pertaining to European Patent Application No. 24198268.5, mailed Jan. 30, 2025.

\* cited by examiner

PHOTOIONIZATION DETECTOR HAVING IMPROVED GAIN AND REDUCED HUMIDITY SENSITIVITY

FIELD OF THE INVENTION

This disclosure relates to an improved photoionization detector. More specifically, it relates to a photoionization detector sensor having a unique electrode pattern that improves the strength of the detection signal while minimizing the sensor's sensitivity to humidity.

BACKGROUND OF THE INVENTION

Photoionization detectors (PIDs) are handheld, portable gas detectors used to measure volatile organic compounds (VOCs), such as benzene, and other organic gases by ionizing environmental gases and measuring the generated electrons. They can produce instantaneous readings and can operate continuously, which make them useful when monitoring for health and safety in military, industrial, and confined working facilities. However, various hurdles exist in the current art.

In one example, PIDs with high VOC gas sensitivity often amplify undesirable system and background noise. More specifically, the electronics in the PID convert the collected electron current to a voltage, and the burden on those electronics is reduced if the PID has high sensitivity. To create this high sensitivity, PIDs have traditionally used transimpedance amplifiers (TIAs). However, these amplifiers increase system and background noise in addition to the VOC signal. Therefore, a higher gain detector that reduces the need for use of transimpedance amplifiers and, consequently, results in an improved signal-to-noise performance of the PID is desired.

In another example, traditional PID sensors are often times affected by humidity if and when they are used outside of controlled, laboratory environments. Since PID sensors are capable of creating current levels down to the femtoampere range proportional to the concentration of an ionized gas being measured, galvanic currents that arise in the presence of electrolytes bridging two conductors comprised of different materials are a potential source of error in PID sensors and, therefore, limit the sensitivity of the detector. More specifically, humidity, when exposed to UV light, can create hydroxyl molecules that can participate in electrical conduction directly or that can alter the conductive properties of the materials with which they are in contact. This conductive medium is a problem when it bridges collector nodes and any other node having a different electrical potential than the collector. Therefore, an improved sensor is needed that maximizes gaps and distances between all electrodes such that they have minimal shared contact areas and allows for a more accurate and sensitive detector that is capable of use in more extreme (i.e., humid) environments.

SUMMARY OF THE INVENTION

The present disclosure relates to a photoionization detector sensor having unique electrode patterns that improve the strength of the detection signal while minimizing the sensor's sensitivity to humidity. In an illustrative but non-limiting example, the disclosure provides a planar photoionization detector that can include a gas discharge lamp that ionizes molecules of interest to create ionized molecules and electrons, and a sensor comprised of at least a plate having at least one opening, and electrically conductive patterns on at least one of the top and bottom surfaces of the plate, including at least a negative electrical potential pattern and an electron collecting electrode pattern, wherein the electron collecting electrode pattern can include a wire suspended across the at least one opening. The plate can be comprised of an electrically insulating substrate and the at least one opening can allow for UV light to pass through.

In some cases, the electrically conductive patterns can further include at least one electrically conductive pattern that is held at electrical ground potential. The planar photoionization detector can further include a feed-thru pin that is electrically connected to the electron collecting electrode pattern. The grounded potential conductive pattern can be located on the same plate surface as the negative electrical potential pattern, and the grounded potential conductive pattern can be interposed between the negative electrical potential pattern and the electron collecting electrode feed-thru pin. Further, the planar photoionization detector can include a second grounded potential conductive pattern on an opposite surface as the grounded potential conductive pattern. The second grounded potential conductive pattern can be interposed between the electron collecting electrode pattern and a feed-thru pin that can be electrically connected to the negative electrical potential pattern. In some cases, the second grounded potential conductive pattern surrounds the at least one opening.

In some embodiments where the electrically conductive patterns can further include at least one electrically conductive pattern that is held at electrical ground potential, the grounded potential conductive pattern can include a first portion located on the same plate surface as the negative electrical potential pattern and a second portion located on an opposite plate surface than the negative electrical potential pattern, and a portion of the second portion of the grounded potential conductive pattern can surrounds the at least one opening. Additionally, the negative electrical potential pattern can include a polarization plate, and the portion of the second portion of the grounded potential conductive pattern that surrounds the at least one opening can align with the polarization plate and a portion of the first portion of the grounded potential conductive pattern.

In some cases, the negative electrical potential pattern can be on one of the top or the bottom surface. Additionally, the negative electrical potential pattern can include a polarization plate. Further, the polarization plate can be adjacent to, and along, a length of the at least one opening.

In other cases, the electron collecting electrode pattern can include a linear pattern on one of the top or the bottom surface of the plate, and the wire suspended across the at least one opening can be on the other of the top or the bottom surface. Further, the electrically conductive patterns can further include at least one electrically conductive pattern that is held at electrical ground potential, and the grounded potential conductive pattern can be interposed between the linear pattern of the electron collecting electrode pattern and the at least one opening. In some cases, the wire can connect on a first end to a first opening near a first side of the plate, the wire can connect on a second end to a second opening near a second side of the plate, and the second opening can also connect to an end of the linear pattern of the electron collecting electrode pattern, thereby connecting the wire to the linear pattern. In some cases, the wire can be comprised of a plurality of wires.

In some cases, the at least one opening in the plate can be a single opening. In other cases, the at least one opening can be comprised of multiple openings. The electrically insulating substrate of the plate can be polytetrafluoroethylene. In some cases, the plate can be a single, hydrophobic layer having the negative electrical potential pattern deposited on the top surface, a grounded potential conductive pattern deposited on the top surface and the bottom surface, and the electron collecting electrode pattern deposited on a bottom surface and including a suspended wire on the top surface.

In another illustrative but non-limiting example, the disclosure provides a planar photoionization detector sensor that can include a plate having a top surface and a bottom surface and being comprised of an electrically insulating substrate, an opening for UV light to pass through, a negative electrical potential pattern including a linear portion and a polarization plate, an electron collecting electrode pattern including a wire suspended across the opening, and a grounded potential conductive pattern having a first portion on the top surface and a second portion on the bottom surface. Various additional limitations may be present. For example, the polarization plate can run adjacent to, and along, a length of the opening, the grounded potential conductive pattern may be interposed between the negative electrical potential pattern and an electron collecting electrode feed-thru pin, the wire can connect on its ends to wire openings located on either end of the opening, the grounded potential conductive pattern can be interposed between the wire openings and the opening, the second portion of the grounded potential conductive pattern can surround the opening, a lower portion of the second portion of the grounded potential conductive pattern can be a UV blocking electrode that runs adjacent to, and along, a length of the opening, and the polarization plate on the top surface can approximately align with the UV blocking electrode on the bottom surface.

In another illustrative, but non-limiting example, the disclosure provides a planar photoionization detector sensor that can include a plate having a top surface and a bottom surface and being comprised of an electrically insulating substrate, at least one opening for UV light to pass through, a negative electrical potential pattern on one of the top or the bottom surface, and an electron collecting electrode pattern having a wire suspended across the at least one opening, wherein the wire can be suspended across the same plate surface that the negative electrical potential pattern is located on.

BRIEF DESCRIPTION OF THE DRAWINGS

FIG. 2b is a bottom view of a prior art photoionization detector sensor of the detector of FIG. 2a.

DETAILED DESCRIPTION

The present disclosure relates to a photoionization detector (PID) sensor having a unique electrode pattern that improves the strength of the detection signal while minimizing the sensor's sensitivity to humidity. Various embodiments of the PID sensor will be described in detail with reference to the drawings, wherein like reference numerals represent like parts and assemblies throughout the several views. Reference to various embodiments does not limit the scope of the PID sensor disclosed herein. Additionally, any examples set forth in this specification are not intended to be limiting and merely set forth some of the many possible embodiments for the PID sensor. It is understood that various omissions and substitutions of equivalents are contemplated as circumstances may suggest or render expedient, but these are intended to cover applications or embodiments without departing from the spirit or scope of the disclosure. Also, it is to be understood that the phraseology and terminology used herein are for the purpose of description and should not be regarded as limiting.

Figure 1:
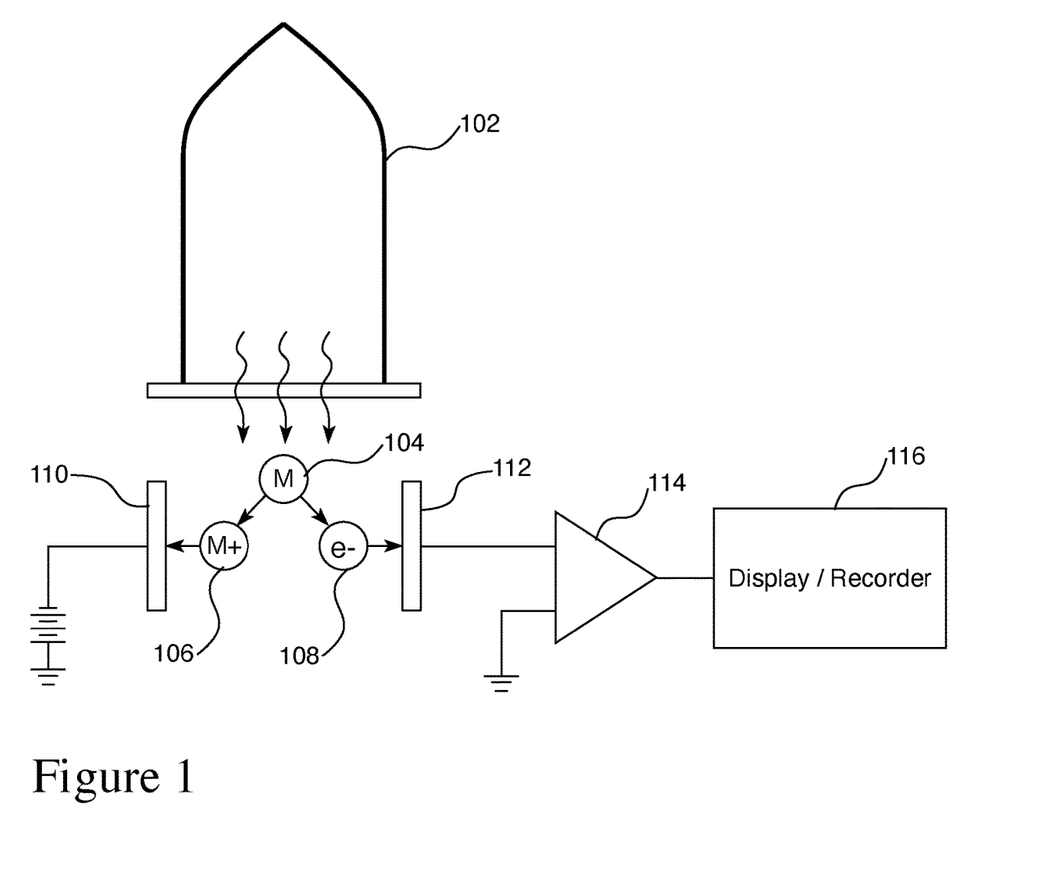
FIG. 1 is a schematic of a photoionization detector.
Figure 2A:
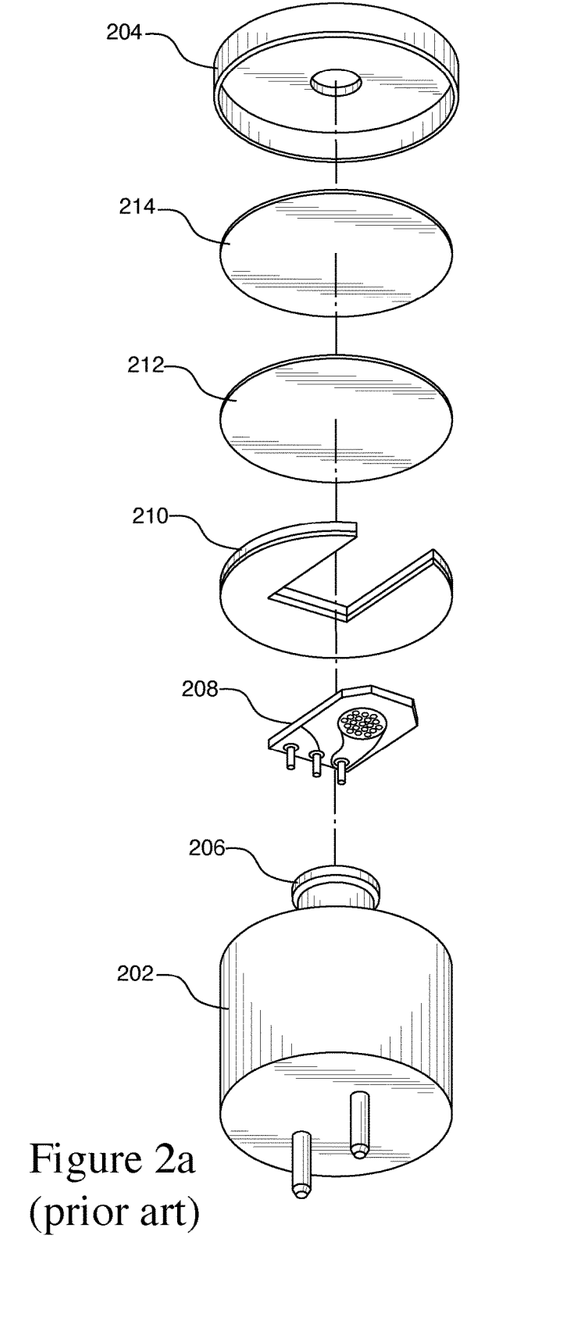
FIG. 2a is an exploded view of a prior art photoionization detector.
Figure 2B:
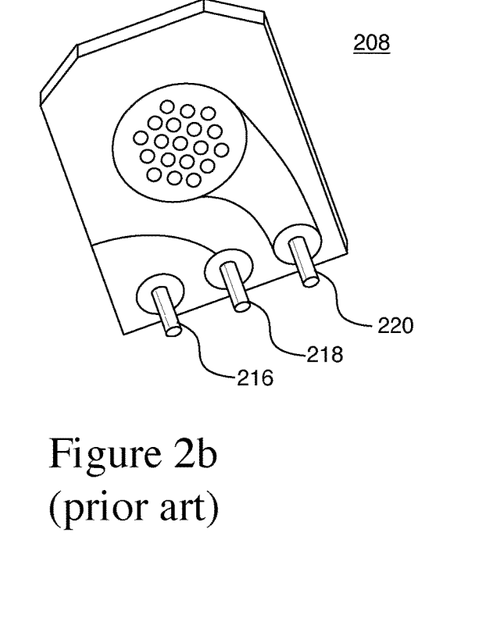
Figure 3:
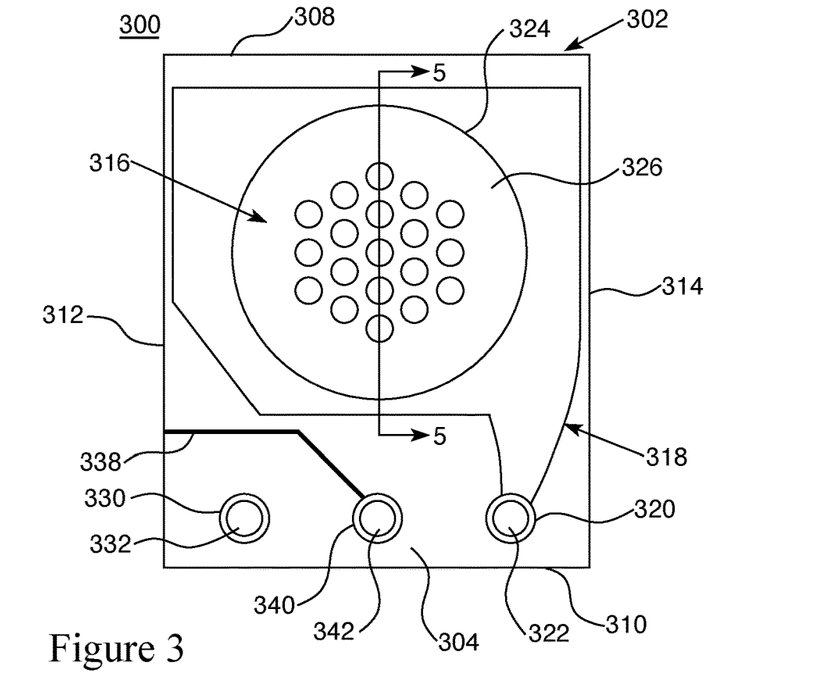
FIG. 3 is a schematic top view of a first embodiment of a photoionization detector sensor according to the present disclosure.
Figure 4:
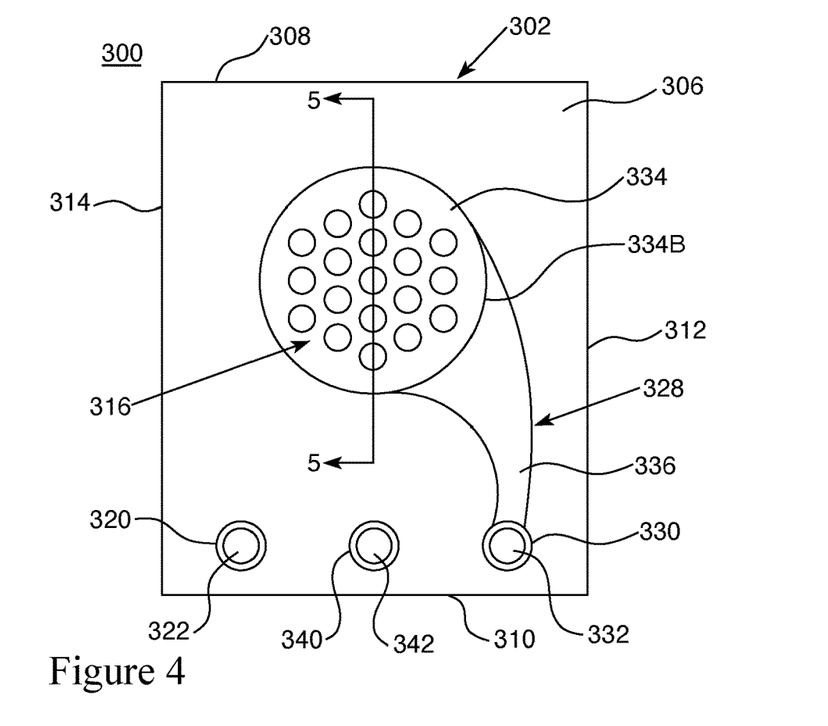
FIG. 4 is a schematic bottom view of the photoionization detector sensor of FIG. 3.
Figure 5:
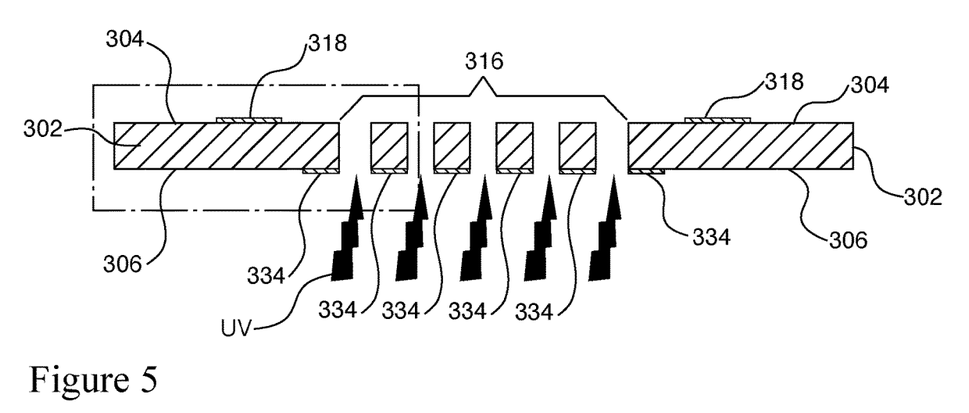
FIG. 5 is a schematic, cross-sectional side view of the photoionization detector sensor of FIGS. 3-4 illustrating where UV light enters the sensor.
Figure 6:
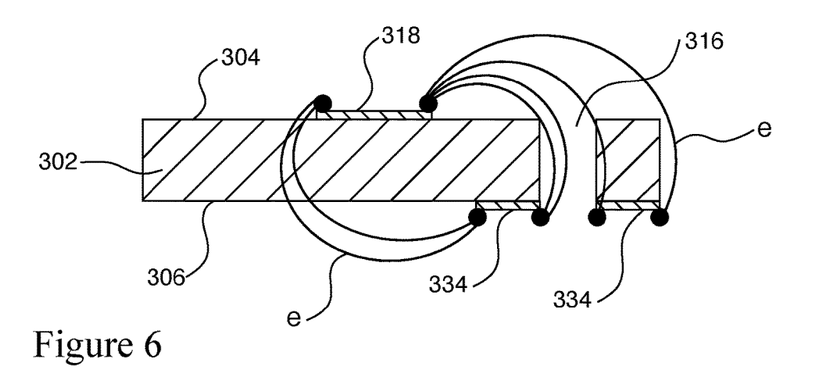
FIG. 6 is a portion of the cross-sectional view of FIG. 5 and illustrates electric field lines generated with use of the photoionization detector sensor of FIGS. 3-4.
Figure 7:
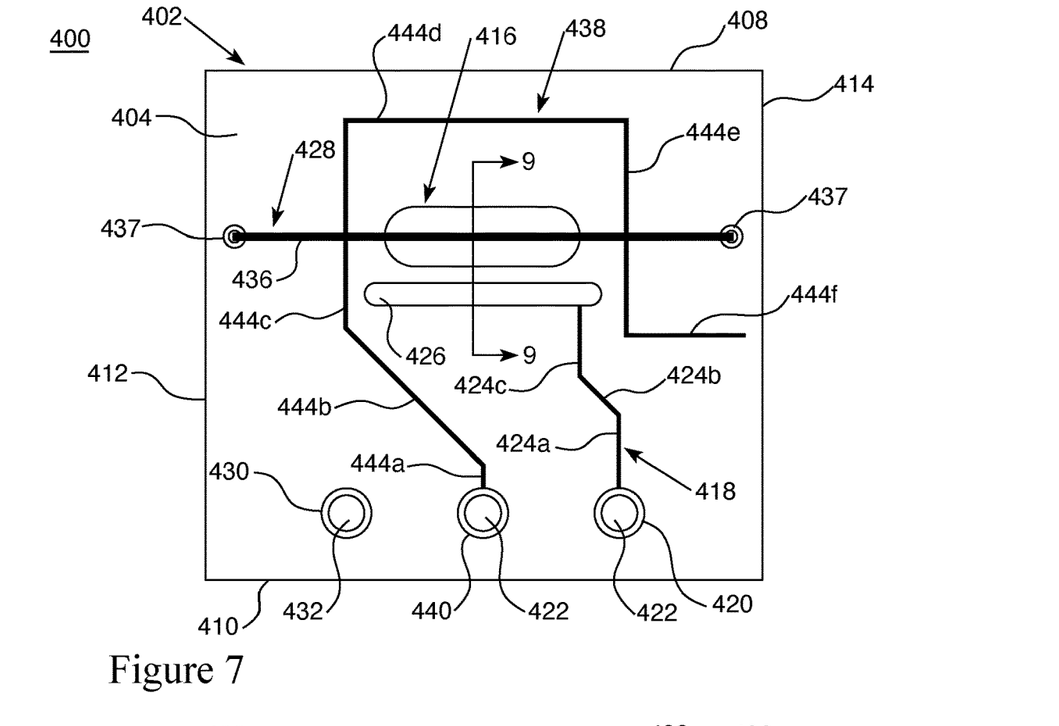
FIG. 7 is a schematic top view of a second embodiment of a photoionization detector sensor according to the present disclosure.
Figure 8:
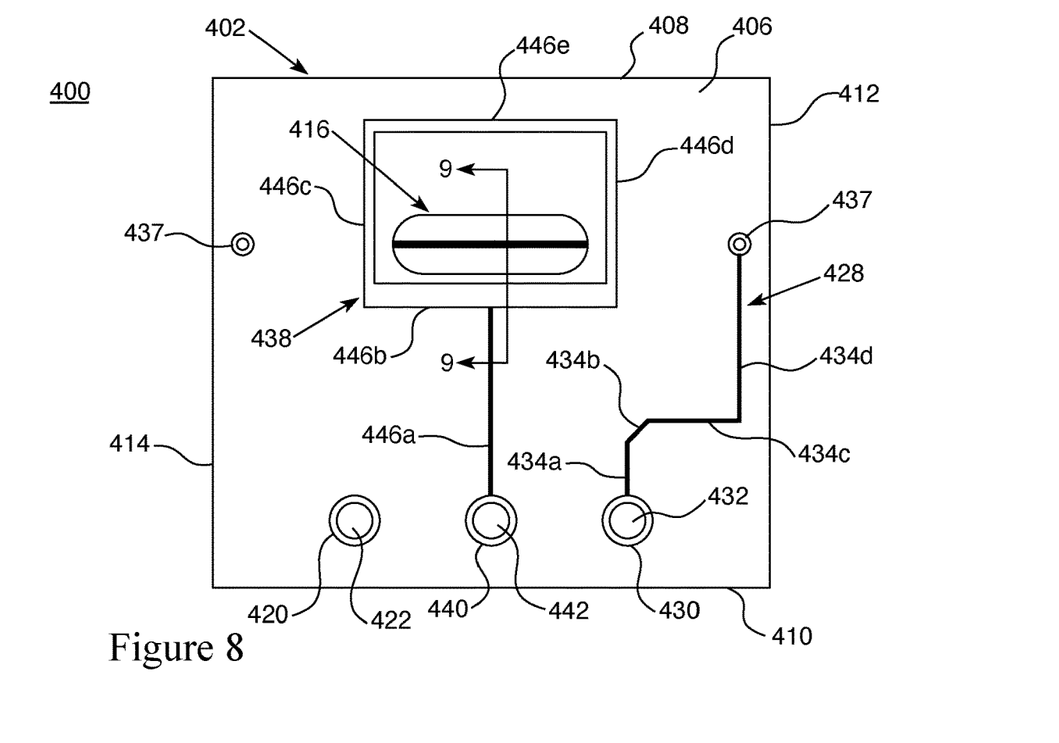
FIG. 8 is a schematic bottom view of the photoionization detector sensor of FIG. 7.
Figure 9:
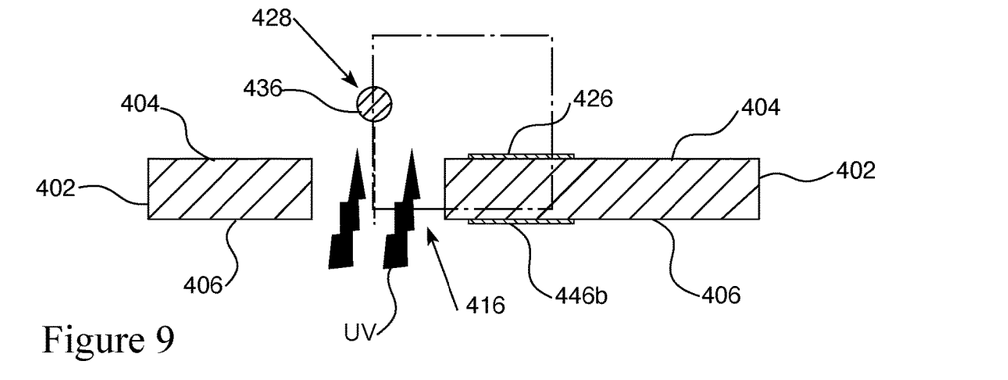
FIG. 9 is a side view of a cross-section of the photoionization detector sensor of FIG. 7 illustrating where UV light enters the sensor.
Figure 10:
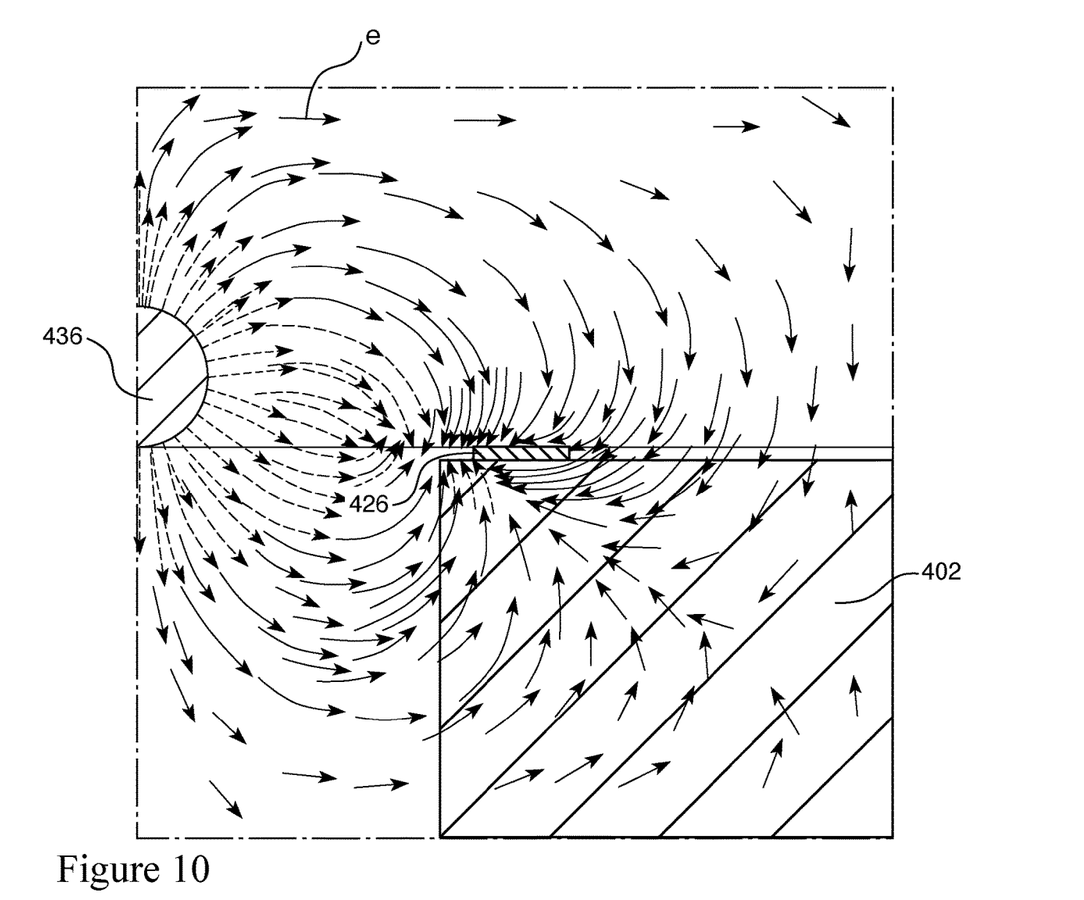
FIG. 10 is a portion of the cross-section view of FIG. 9 and illustrates electric field lines generated with use of the photoionization detector sensor of FIG. 7.

FIGS. 1-10 illustrate various views of elements of a photoionization detector according to the present disclosure. FIG. 1 is a schematic of a photoionization detector. FIG. 2a is an exploded view of a prior art photoionization detector. FIG. 2b is a bottom view of a prior art photoionization detector sensor of the detector of FIG. 2a. FIG. 3 is a schematic top view of a first embodiment of a photoionization detector sensor according to the present disclosure. FIG. 4 is a schematic bottom view of the photoionization detector sensor of FIG. 3. FIG. 5 is a schematic, cross-sectional side view of the photoionization detector sensor of FIGS. 3-4 illustrating where UV light enters the sensor. FIG. 6 is a portion of the cross-sectional view of FIG. 5 and illustrates electric field lines generated with use of the photoionization detector sensor of FIGS. 3-4. FIG. 7 is a schematic top view of a second embodiment of a photoionization detector sensor according to the present disclosure. FIG. 8 is a schematic bottom view of the photoionization detector sensor of FIG. 7. FIG. 9 is a side view of a cross-section of the photoionization detector sensor of FIG. 7 illustrating where UV light enters the sensor. FIG. 10 is a portion of the cross-section view of FIG. 9 and illustrates electric field lines generated with use of the photoionization detector sensor of FIG. 7.

Some embodiments of PIDs disclosed herein include a sensor having two or more electrodes, a gas discharge lamp, and an amplifier connected to one of the two or more electrodes. The two or more electrodes of the PID sensor can be comprised of a collector electrode, a negative bias electrode, a grounding electrode, and combinations thereof (ex: a collector electrode and a grounding electrode). The negative bias electrode and the collector electrode can support an electrostatic field. The grounding electrode can establish a low impedance path back to a supply source to facilitate the operation of the device by intercepting currents that may arise between the negative bias and collector electrodes (often configured as a guard trace) as well as establish a stable voltage to ground during operation.

As illustrated in FIG. 1, a gas discharge lamp 102 can ionize molecules of interest 104 (such as VOC gas molecules) to create ionized molecules 106 and electrons 108. More specifically, when a UV light source in the gas discharge lamp 102 is activated, it can ionize environmental gases, such as VOC gases, and create ionized molecules 106 and electrons 108. The ionized molecules 106 can be collectable by a negative bias electrode 110, and the electrons 108 can be collectable by the collector electrode 112.

The collector electrode 112 can be connected to the amplifier 114, which can be a high gain transimpedance amplifier (TIA) that measures the electrons 108 generated from the ionized gas and provides a measure that is proportional to the gas concentration in the environment. When the gas 104 is ionized, the electrons 108 produced can be accelerated to the collector electrode 112 by the electrostatic field developed between the negative bias 110 and the collector 112 electrodes. The results can be sent from the amplifier to a display/record 116 for observance by a user. The ionized molecules 106 can receive an electron from the negative bias electrode 110, thereby reforming the molecules of interest 104.

The efficiency of the electron collection and ion recombination process is dependent upon the electrode area and the electric field intensity. The intensity of the electric field can be affected by the use and structure of the PID sensor. For example, increasing voltage, decreasing separation distance between the collector and negative potentials, and/or decreasing the radius of curvature of the electrode patterns can all increase the electric field intensity. As mentioned above, the use of TIAs increases system and background noise in addition to the VOC signal. Therefore, increasing the intensity of the electric field can allow for a reduction in amplifier gain and, consequently, can result in an improved signal-to-noise performance of the PID.

Generally, the PID can have components that are contained within a cylindrical housing, as illustrated by the prior art PID 200 in FIG. 2a. More specifically, the cylindrical housing can include a sensor body 202 with a cap 204, wherein the sensor body and cap contain a gas discharge lamp 206 (having a UV light source), a sensor 208, a spacer 210, a filter cloth 212, and a filter 214. The components can be stacked on top of one another, as illustrated in FIG. 2a, and the gas discharge lamp 206 and sensor 208 can be placed adjacent to one another.

As mentioned briefly above, the sensor can include two or more electrodes such as, but not limited to, a negative bias electrode, a collector electrode, and a grounding electrode. The electrodes 216, 218, 220 can be approximately circular and can be positioned in line with each other, as illustrated in FIG. 2b. In some embodiments, electrode 216 can be a negative bias electrode, electrode 218 can be a grounding electrode, and electrode 220 can be a collector electrode. Even though the PID in FIG. 2a and the details of the PID sensor in 2b are prior art, their components and layout can remain consistent with the PID and sensor described herein. More specifically, as illustrated in FIGS. 3-4 and 7-8, similar to PID sensor 208 from FIG. 2b, the grounding electrode 340/440 on the PID sensor 300/400 can be positioned between the negative bias electrode 320/420 and the collector electrode 330/430.

Prior art electrodes 216, 218 and 220, as illustrated in FIGS. 2a-b, are approximately circular. Since a voltage differential between negative bias and collector electrodes can typically be tens or hundreds of volts, a third electrode, a grounding electrode, can be employed to block surface conduction currents that may arise between the bias and collector electrodes. The collector and grounding electrodes can each include respective feed-thru pins that are electrically connected. Typical materials used in the PID include gold-plated features and tin-containing solders. Solder may be placed over the feed-thru pins and may further cover portions of the inner traces such that the appearance of each electrode is that of an inner trace with solder on top of it.

As mentioned above, the improvement in the present disclosure is related to the structure and geometry of the PID sensor and its electrode patterns, which has been designed to concentrate the electric field to regions of ionized molecules of interest in order to increase gains and improve linearity. Described herein are two embodiments of PID sensors that both accomplish the above-recited purpose. Both include at least three electrodes, each electrode having a feed-thru pin, and each electrode having at least a first side on a top or bottom of the sensor plate and a second side on the other of the top or bottom of the sensor plate. More specifically, the at least three electrodes can be a collector electrode and a grounding electrode that are located adjacent to one another along with a negative bias electrode. The electrodes can be approximately circular and the feed-thru pins for each electrode can be approximately centered. The feed-thru pins can be comprised of materials such as bronze, brass, copper, beryllium-copper, stainless steel, which can be plated with, Nickel, Gold, Silver, Platinum, Tin-lead, and Tin-silver. Each feed-thru pin can be soldered in place, and the solder can surround the feed-thru pins. Connected to the electrodes can be electrically conductive patterns. These patterns can be on the top and/or bottom surfaces of the sensor plate and can aid in concentrating the electric field to regions of ionized molecules of interest.

Embodiment 1

The first PID sensor embodiment 300 is illustrated in FIGS. 3-6 and includes a plate 302 having electrically conductive patterns on the top 304 and bottom 306 surfaces, wherein a negative electrical potential pattern 318 is on one of the top 304 or bottom 306 surfaces, an electron collecting electrode pattern 328 is on the other of the top 304 or the bottom 306 surface, and the two patterns are offset relative to each other, as illustrated by FIGS. 3-4. As illustrated in FIG. 5, to allow for ultraviolet (UV) light from the gas discharge lamp to pass through and create ionized molecules and electrons, the plate 302 can include at least one opening 316. FIG. 6 illustrates the concentrated electric field as a result of the electrically conductive patterns on the sensor plate.

Negative Electrical Potential Pattern

Generally, the negative electrical potential pattern 318 can be on a top surface 304 of the plate 302, as illustrated in FIG. 3, can have an approximately rectangular outer perimeter, and can connect to a negative bias electrode 320 that is located near one of the four corners of the top surface 304 of the sensor plate 302 (for example, a lower righthand corner, as illustrated in FIG. 3). The negative electrical potential pattern 318 can be comprised of a metal such as, but not limited to, copper, nickel, chromium, titanium, gold, silver, platinum, and stainless steels.

The negative electrical potential pattern 318 can be located along, without touching, at least portions of at least three of the four edges of the sensor 300, as illustrated in FIG. 3. More specifically, the negative electrical potential pattern 318 can be located along an entire first edge of the sensor 300 (for example, the upper edge 308 in FIG. 3) such that the length of the first edge of the negative electrical potential pattern 318 can be approximately the same as the length of the upper edge 308 of the sensor plate 302. Further, the negative electrical potential pattern 318 can be located along portions of a second and third edge of the PID sensor 300 (for example, the left 312 and right edges 314 in FIG. 3), and the first edge of the sensor 300 can be located between the second and third edges of the sensor 300 such that a first end of the first edge connects to one end of the second edge and a second end of the first edge connects to one end of the third edge. The length of each of the second and third negative electrical potential pattern edges may be half to three-quarters the length of the sensor plate side edges 312, 314.

In some embodiments, an interior portion 324 of the negative electrical potential pattern 318 can be at least a first distance away from every edge of the at least one opening 316. More specifically, the negative electrical potential pattern 318 can include a circular void 326 in its interior (for example, its center), and the circular void 326 can surround the at least one opening 316. In some cases, the circular void 326 can simply be an opening in the negative electrical potential pattern 318. Therefore, the void 326 can be open to hydrophobic material of the plate 302. In other cases, the circular void 326 can be comprised of a hydrophobic material such that the void 326 is an additional layer on top of the plate 302. The hydrophobic material can be polytetrafluoroethylene.

As mentioned above, the outer perimeter of the negative electrical potential pattern 318 can be approximately rectangular. Therefore, the general appearance of the negative electrical potential pattern 318 can be that of a rectangle with a circular void 326 in its center. As illustrated in FIG. 3, the rectangular perimeter may not be uniform. More specifically, at least one corner of the perimeter may be missing. As mentioned herein, the negative electrical potential pattern 318 and the electron collecting electrode pattern 328 can be offset from each other. Therefore, the absence of the negative electrical potential pattern 318 in one corner can align with the presence of a portion of the electron collecting electrode pattern 328 on a bottom surface 306 of the plate 302.

In embodiments wherein the at least one opening 316 is a plurality of openings, the plurality of openings can form an approximately circular shape, as illustrated in FIGS. 3-4. In some cases, the plurality of openings 316 can form an approximately circular outline and can continue within the approximately circular outline such that they fill in the space therein. As mentioned above, the negative electrical potential pattern 318 can include a void 326. In embodiments where there is a void 326, the outer edges of the circular void 326 can be equidistant from the approximately outer circumference of the circular outline of the plurality of openings 316, thereby minimizing overlapping of the negative electrical potential pattern 318 and the electron collecting electrode pattern 328. As such, the only portions of the two patterns that may overlap are the remaining corner portion of the negative electrical potential pattern 318 (i.e., the band of metal material that remains between the void 326 and the absent corner) and the portion of the electron collecting electrode pattern 328 that transitions from the core pattern 334 to the connection pattern 336 (described in more detail below).

Electron Collecting Electrode Pattern

Generally, the electron collecting electrode pattern 328 can be on a bottom surface 306 of the plate 302, as illustrated in FIG. 4, can have an approximate teardrop shape, and can connect to a positive collector electrode 330 that is located near one of the four corners of the bottom surface 306 of the sensor plate 302 (for example, a lower righthand corner, as illustrated in FIG. 4). Similar to the negative electrical potential pattern 318, the electron collecting electrode pattern 328 can be comprised of a metal such as, but not limited to, copper, nickel, chromium, titanium, gold, silver, platinum, and stainless steels.

As mentioned above, the electron collecting electrode pattern 328 can be offset relative to the negative electrical potential pattern 318. More specifically, the electron collecting electrode pattern 328 can substantially fill an area surrounding the opening(s) 316 whereas the negative electrical potential pattern 318 includes a void 326 in that corresponding space on the opposing side (for example, the top 304) of the plate 302. Therefore, the area of the electron collecting electrode pattern 328 around the opening(s) 316 can be similar to, or smaller than, the space between the edges of the opening(s) 316 and the presence of the material portion of the negative electrical potential pattern 318.

In some embodiments, the electron collecting electrode pattern 328 can have an approximate teardrop shape that is comprised of a core pattern 334 and a connection pattern 336. The core pattern 334 can be an approximately circular pattern around the at least one opening 316, and the connection pattern 336 can be an oblong extension that connects the core pattern 334 to the positive collector electrode 330, as illustrated by the broken line 334B delineating the two component patterns in FIG. 4. In some cases, the core pattern 334 and the connection pattern 336 can be comprised of two separate pieces of the same or different material. In other cases, as illustrated herein, the core pattern 334 and connection pattern 336 can be shaped from the same piece of material.

The core pattern 334 can have a first diameter on at least three quarters of its sides, such that the distance from the center of the core pattern 334 out to the outer circumference is the same, or similar, along at least three-quarters of its sides/edges. The diameter of the remaining portion of the core pattern 334 can vary to accommodate the attachment/ transition to the connection pattern 336. As illustrated herein, the core pattern 334 can expand out past the outer edges of the at least one opening 316 such that it includes an outer, circumferential continuous surface that is uninterrupted.

To enable the electron collecting electrode pattern 328 to be offset from the negative electrical potential pattern 318, the outer edge of the core pattern 334 (i.e., the portion of the core pattern 334 that is an outer, circumferential continuous surface) can be closer to the center of the at least one opening 316 than the interior portion 324 of the negative electrical potential pattern 318. More specifically, as mentioned above, the negative electrical potential pattern 318 may include a circular void 326. The outermost part of the circular void 326 may be a shared border with the interior portion 324 of the negative electrical potential pattern 318. The core pattern 334 of the electron collecting electrode pattern 328 may fit within the circular void 326, a minority portion of the connection pattern 336 of the electron collecting electrode pattern 328 may overlap with the material portion of the negative electrical potential pattern 318, and the majority of the connection pattern 336 of the electron collecting electrode pattern 328 may be split between the circular void 326 and outside of the outermost portion of the negative electrical potential pattern 318.

In some embodiments, the at least one opening 316 may be a plurality of openings that form an approximately circular shape. This circular configuration of the plurality of openings 316 can be located within the circular void 326. Therefore, with the electron collecting electrode pattern 328 offset from the negative electrical potential pattern 318, the core pattern 334 of the electron collecting electrode pattern 328 can substantially fill an area surrounding the plurality of circular openings 316 and can have a diameter that is smaller than the diameter of the circular void 326.

Grounded Potential Conductive Pattern

Generally, the grounded potential conductive pattern 338 can be an electrically conductive pattern that is held at electrical ground potential, can be located on a top surface 304 of the plate 302, as illustrated in FIG. 3, can be an approximately angular line, and can connect to a grounded electrode 340 that is located between the collector electrode 330 and the negative bias electrode 320 on the sensor plate 302 (for example, a lower middle portion, as illustrated in FIG. 3). The grounded potential conductive pattern 338 can be comprised of a metal such as, but not limited to, copper, nickel, chromium, titanium, gold, silver, platinum, and stainless steels.

Whereas the negative electrical potential pattern 318 and the electron collecting electrode pattern 328 of the PID sensor 300 are shapes that correspond to, and are structured for, the at least one opening 316, the grounded potential conductive pattern 338 can be a simple, approximately obtuse, angular line. As illustrated in FIG. 3, the negative electrical potential pattern 318 can be located on the same surface as the negative electrical potential pattern 318 (for example, the top surface 304), and can be interposed between the negative electrical potential pattern 318 and the electron collecting electrode 330 and feed-thru pin 332 for the purposes of minimizing surface conduction effects. More specifically, the grounded potential conductive pattern 338 can have a first, linear portion/segment that runs at an angle (for example, an angle between 30 degrees and 60 degrees, such as 45 degrees) and a second, linear portion/segment that runs parallel to two opposing edges of the plate 302 (for example, the upper 308 and lower 310 edges). A first end of the grounded potential conductive pattern 338 can connect to the grounded electrode 340 and a second end of the grounded potential conductive pattern 338 can end near a side edge 312 of the plate 302. The second end can be closer to the side edge 302 than the collector electrode 330.

Feed-Thru Pins and Pattern Positioning/Location

Similar to the prior art sensor illustrated in FIGS. 2a-b, a feed-thru pin 322, 332, 342 can be present for each of the electrodes (negative bias 320, positive collector 330, and grounded 340). These feed-thru pins 322, 332, 342 can be electrically connected to their corresponding patterns 318, 328, 338. In other words, the negative bias electrode 320 can be electrically connected to the negative electrical potential pattern 318, the positive collector electrode 332 can be electrically connected to the electron collecting electrode pattern 328, and the grounded electrode 340 can be electrically connected to the grounded potential conductive pattern 338.

As mentioned briefly above, the patterns 318, 328, 338 can be on similar or opposing surfaces of the plate 302. In one embodiment, the negative electrical potential pattern 318 and the grounded potential conductive pattern 338 may both be located on the same surface of the plate 302 (for example, the top surface 304, as illustrated in FIGS. 3-4), and the electron collecting electrode pattern 328 can be located on an opposing surface of the plate 302 (for example, the bottom surface 306).

However, this arrangement is not required. In other embodiments, the electron collecting 328 and grounded 338 patterns can be on the same surface (for example, the top 304) and the negative electrical potential pattern 318 can be on the opposing surface of the plate 302 (for example, the bottom 306). And in some embodiments, all three patterns 318, 328, 338 can be located on the same side of the plate 302 (for example, the top 304 or bottom 306).

In addition to relative location of the patterns 318, 328, 338 to each other, there may be designated placement of the patterns 318, 328, 338 relative to other patterns or feed-thru pins. For example, as illustrated in FIG. 3 and mentioned above, the grounded potential conductive pattern 338 can be interposed between the negative electrical potential pattern 318 and the electron collecting electrode 330 and feed-thru pin 332. However, as with the location of the patterns, their location relative to each other may vary. Therefore, in some embodiments, the grounded potential conductive pattern 338 may be interposed between the electron collecting electrode pattern 328 and the negative bias electrode 320 and feed-thru pin 322 that connects to the negative electrical potential pattern 318. Further, in some embodiments, the grounded potential conductive pattern 338 may be comprised of two patterns such that one pattern can be present on opposing sides (ex: top 304 and bottom 306) of the plate 302. Therefore, in such an embodiment, the grounded potential conductive pattern 338 can be interposed between (1) the negative electrical potential pattern 318 and the electron collecting electrode 330 and feed-thru pin 332, and (2) the electron collecting electrode pattern 328 and the negative bias electrode 320 and feed-thru pin 322.

As mentioned above, the plate 302 can include at least one opening 316 and can be comprised of an electrically insulating substrate (for example, polytetrafluoroethylene). The at least one opening 316 may be one single opening, or it may be a plurality of openings, as illustrated in FIGS. 3-4. As mentioned above, in embodiments with a plurality of openings, the openings may be approximately circular, may collectively take the shape of a circle, and may fill in the circular shape. Therefore, the plurality of openings may take on a circular shape that is comprised of open circles. In embodiments with a single opening, the single opening may be of a similar diameter as embodiments having a plurality of openings.

PID Sensor Plate

Generally, the PID sensor plate 302 may be rectangular, have a top surface 304, a bottom surface 306, an upper edge 308, a lower edge 310, and two side edges 312 and 314. The top 304 and bottom 306 surfaces may be the portions of the plate 302 upon which the negative electrical potential pattern 318, the electron collecting electrode 330, and the grounded potential conductive pattern 338 can be deposited. The feed-thru pins 322, 332, 342 may be positioned between the top 304 and bottom 306 surfaces and near the lower edge 310. Depending on the type of feed-thru pin and electrode (i.e., negative bias, positive, or grounded), the feed-thru pin and electrode may be nearer to one side edge 312 or 314 than another. Alternatively, they may be centered between the two side edges 312 and 314.

Contrary to prior art sensors, wherein the plate is comprised of two material layers with the patterns deposited on the top, bottom, and in the middle, the plate 302 of the current disclosure can be limited to a single, hydrophobic layer having patterns on only the outer surfaces. More specifically, as described above, the negative electrical potential pattern 318 can be deposited on the top surface 304, the grounded potential conductive pattern 338 can be deposited on the top surface 304, and the electron collecting electrode pattern 328 can be deposited on the bottom surface 306. Other arrangements of the patterns on the top 304 and/or bottom 306 surfaces are described above.

While embodiments of the PID sensor 300 can include combinations of the above features, the embodiments themselves can vary while still improving signal-to-noise performance and maximizing gaps and distances between all electrodes such that they have minimal shared contact areas and allow for a more accurate and sensitive detector that is capable of use in more extreme (i.e., humid) environments.

For example, an embodiment of the PID sensor 300 can include a plate 302 being comprised of an electrically insulating substrate, a plurality of circular openings 316 for UV light to pass through, a negative electrical potential pattern 318 on the top surface 304 of the plate 302, an electron collecting electrode pattern 328 on the bottom surface 306 of the plate 302, and a grounded potential conductive pattern 338 on the top surface 304 of the plate 302. The plurality of circular openings 316 can form an approximate circle, the negative electrical potential pattern 318 can include a circular void 326 in its center, the circular void 326 can surround the plurality of circular openings 316, the circular void 326 of the negative electrical potential pattern 318 can be comprised of a hydrophobic material, the negative electrical potential pattern 318 can be at least a first distance away from every edge of the plurality of circular openings 316, the electron collecting electrode pattern 328 can be comprised of a core pattern 334 and a connection pattern 336, the core pattern 334 of the electron collecting electrode pattern 328 can substantially fill an area surrounding the plurality of circular openings 316, the connection pattern 336 can connect the core pattern 334 to an electron collecting electrode feed-thru pin 332, a diameter of the core pattern 334 of the electron collecting electrode pattern 328 can be smaller than a diameter of the circular void 326, and the grounded potential conductive pattern 338 can be interposed between the negative electrical potential pattern 318 and the electron collecting electrode feed-thru pin 332.

In another example, an embodiment of the PID sensor 300 can include a plate 302 being comprised of an electrically insulating substrate, at least one opening 316 for UV light to pass through, a negative electrical potential pattern 318 on the top surface 304 of the plate 302, and an electron collecting electrode pattern 328 on the bottom surface 306 of the plate 302. Similar to above, the negative electrical potential pattern 318 can include a void 326 in its center, and the void 326 can surround the at least one opening 316. Additionally, the negative electrical potential pattern 318 and the electron collecting electrode pattern 328 can be offset relative to each other, the negative electrical potential pattern 318 can be located along, without touching, at least portions of at least three of four edges of the sensor 300, the negative electrical potential pattern 318 can be located along an entire first edge 308 of the sensor 300, the negative electrical potential pattern 318 can be located along a portion of a second 312 and a third edge 314 of the sensor 300, and the first edge 308 of the sensor 300 can be between the second 312 and third 314 edges of the sensor 300.

In use, a photoionization detector with the improved geometry and architecture for the sensor electrodes can be used by activating a gas discharge lamp and reading an output of the amplifier. The gas discharge lamp can have a UV light source and can ionize molecules of interest to create ionized molecules and electrons. The ionized molecules can be collected by a negative bias electrode 320 on a sensor 300, and the electrons can be collected by a collector electrode 330 on the sensor 300. In some embodiments, the collector electrode 330 can further be connected to an amplifier. The sensor 300 can include a plurality of electrically conductive patterns on the top 304 and bottom 306 surfaces of an electrically insulated plate 302. A negative electrical potential pattern 318 can be on one of the top 304 or the bottom 306 surface of the plate 302 and can have a void 326 leaving an interior edge 324 of the negative electrical potential pattern 318 at least a first distance away from an opening 316 in the plate 302. An electron collecting electrode pattern 328 can be on the surface of the plate 302 opposite the negative electrical potential pattern 318 and can both surround the opening 316 in the plate 302 and fill a similarly sized area to the void 326 of the negative electrical potential pattern 318 such that the two patterns are offset relative to each other. A grounded potential conductive pattern 338 on the sensor 300 can be located between the negative electrical potential pattern 318 and the collector electrode 330 and feed-thru pin 332.

Embodiment 2

The second PID sensor embodiment 400 is illustrated in FIGS. 7-10 and includes a plate 402 having at least one opening 416 and electrically conductive patterns 418, 428, 438 on the top 404 and bottom 406 surfaces, wherein a negative electrical potential pattern 418 is on one of the top 404 or bottom 406 surfaces, an electron collecting electrode pattern 428 is on the other of the top 404 or the bottom 406 surface, and the electron collecting electrode pattern 428 is comprised of a wire 436 suspended across the at least one opening 416, as illustrated by FIGS. 7-8. As illustrated in FIG. 9, the at least one opening 416 allows for ultraviolet (UV) light from the gas discharge lamp to pass through the plate 402, interact with an ionizing gas in close proximity to the wire 436, and create ionized molecules and electrons. FIG. 10 illustrates the concentrated electric field as a result of the electrically conductive patterns 418, 428, 438 (for example, the polarization plate 426 of the negative electrical potential pattern 418 and the wire 436 of the electron collecting electrode pattern 428) on the sensor plate 402. Generally, Embodiment 2 (PID sensor 400) reduces the surfaces that can adsorb water, which is beneficial since adsorbed water can lead to leakage currents between the polarization plate 426 of the negative electrical potential pattern 418 and the wire 436 of the electron collecting electrode pattern 428.

Negative Electrical Potential Pattern

Generally, the negative electrical potential pattern 418 can be on, but is not limited to, a top surface 404 of the plate 402, as illustrated in FIG. 7, and can be comprised of a plurality of linear portions/segments 424, a polarization plate 426, a negative bias electrode 420, and a feed-thru pin 422. In some embodiments, the linear portions/segments 424 can connect between the polarization plate 426 and the negative bias electrode 420 and feed-thru pin 422. The negative bias electrode 420 and feed-thru pin 422 can be located near one of the four corners of the top surface 404 of the sensor plate 402 (for example, a lower righthand portion or corner of the plate 402, as illustrated in FIG. 7). The negative electrical potential pattern 418 can be comprised of a metal such as, but not limited to, copper, nickel, chromium, titanium, gold, silver, platinum, and stainless steels.

The plurality of linear portions/segments 424 of the negative electrical potential pattern 418 can be comprised of three portions (although the number of portions/segments may be greater or fewer). As mentioned above, the negative electrical potential pattern 418 can be on a top surface 404 of the plate 402. In other embodiments, however, the negative electrical potential pattern 418 can be on a bottom surface 406 of the plate 402. The first linear portion 424a of the plurality of linear portions/segments 424 may be parallel to the two opposing edges of the plate 402 (for example, the side edges 412 and 414). The second linear portion 424b may be at an angle (for example, between 30 degrees and 60 degrees, such as 45 degrees). The third linear portion 424c may be parallel to the two opposing edges of the plate 402 (for example, the side edges 412 and 414). Therefore, the first 424a and third 424c segments may be parallel to each other. Additionally, the third segment 424c may be closer to the middle of the plate 402 and, therefore, further from side edge 414 than first segment 424a is, as illustrated in FIG. 7.

A first end of the negative electrical potential pattern 418 can connect to the negative bias feed-thru pin 422 and electrode 420. A second end of the negative electrical potential pattern 418 can connect to the polarization plate 426. The second end may connect near an end of the polarization plate 426 that is nearest the negative bias electrode 420, as illustrated in FIG. 7. Therefore, even though the third segment 424c (and the second end) may be more central than the first segment 424a (and the first end), the third segment 424c and second end may still be closer to side edge 414 than side edge 412. Alternatively, the second end may connect nearer to a central portion of the polarization plate 426 or near the end of the polarization plate 426 that is furthest from the negative bias electrode 420 (i.e., nearer to side edge 412 than to side edge 414). In some cases, the negative electrical potential pattern 418 can be a single, linear or curved pattern (instead of a plurality of segments) having two ends, wherein a first end connects to the negative bias electrode 420 and feed-thru pin 422, and a second end connects to the polarization plate 426.

The polarization plate 426 can, in some cases, appear as an extension of the linear portions/segments 424 such that the two components are a continuation of the same material. In some embodiments, as illustrated in FIG. 7, the polarization plate can be wider than the linear portions/segments 424. More specifically, the width of the first segment 424a is defined herein as the distance of the material from left to right in FIG. 7 and the width of the second segment 424b and third segment 424c is illustrated as being the same as the width of the first segment 424a, although there may be variation. The width of the polarization plate 426 is defined herein as the distance of the material from top to bottom in FIG. 7. Therefore, as illustrated, the polarization plate 426 is wider than the linear portions/segments 424.

In some embodiment, and as illustrated in FIG. 7, the polarization plate 426 can run adjacent to, and along, a length of the at least one opening 416. In some cases, the opening(s) 416 may be wider than the polarization plate 426, with the width of the opening(s) 416 being defined herein as the distance of the opening(s) 416 from top to bottom in FIGS. 7-8. Further, the polarization plate 426 can be longer than the opening(s) 416, with the length of the opening(s) 416 and the polarization plate 426 being defined herein as their respective distances from left to right in FIGS. 7-8. Therefore, the ends of the polarization plate 426 may be closer to both side edges 412 and 414 than the opening(s) 416, although both the opening(s) 416 and the polarization plate 426 can be approximately centered between the two side edges 412, 414.

Electron Collecting Electrode Pattern

Generally, the electron collecting electrode pattern 428 can be on a top 404 and a bottom 406 surface of the plate 402, as illustrated in FIGS. 7-8, and can include a linear pattern 434 comprised of a first material, a wire 436 suspended across at least one opening 416 in the plate 402, a positive collector electrode 430, a feed-thru pin 432, and wire openings 437. In some embodiments, the linear pattern 434 can connect to a positive collector electrode 430 and feed-thru pin 432 on one end and a wire opening 437 on an opposing end. The negative bias electrode 420 and feed-thru pin 422 can be located near one of the four corners of the bottom surface 406 of the sensor plate 402 (for example, a lower righthand portion or corner of the plate 402, as illustrated in FIG. 8). Similar to the negative electrical potential pattern 418, the linear pattern 434 of the electron collecting electrode pattern 428 can be comprised of a metal such as, but not limited to, copper, nickel, chromium, titanium, gold, silver, platinum, and stainless steels. The suspended wire 436 can be comprised of a metal such as, but not limited to, gold, copper, nickel, platinum, and stainless steels.

In some embodiments, the linear pattern 434 of the electron collecting electrode pattern 428 can be deposited on a first surface of the plate 402, and the suspended wire 436 can be suspended above a second surface of the plate 402. Therefore, as illustrated in FIG. 8, the linear pattern 434 can be deposited on the bottom surface 406 of the plate 402 while the suspended wire 436 can be suspended above the top surface 404 of the plate 402. This may be reversed in some cases, and the linear pattern 434 may be deposited on the top surface 404 while the suspended wire 436 may be suspended above the bottom surface 406 of the plate 402. In yet other embodiments, the linear pattern 434 and the suspended wire 436 can be on the same surface (for example, both on the top 404 or both on the bottom 406).

The linear pattern 434 can be comprised of a plurality of linear portions/segments that connect the collector electrode 430 and feed-thru pin 432 to a wire opening 437 that is also connected to a first end of the wire 436 (for example, the wire 436 can be soldered in place in the opening(s) 437). Therefore, one end of the linear pattern 434 can connect to the collector electrode 430 and feed-thru pin 432 and a second, opposite end of the linear pattern 434 can connect to a wire opening 437. As mentioned above, the linear pattern 434 can be comprised of a plurality of linear portions/segments. In some cases, the plurality of linear portions/segments of the linear pattern 434 can be comprised of four segments although, as with the linear portions/segments 424 of the negative electrical potential pattern 418, there may be fewer or more segments in the linear pattern 434 of the electron collecting electrode pattern 428 than four.

The linear pattern 434 may be comprised of a first, short segment 434a that is parallel to the side edges 412 and 414 of the plate 402, a second, angled segment 434b (for example, between an angle of 30 degrees and 60 degrees, such as 45 degrees) that is relatively short, a third segment 434c that is perpendicular to the side edges 412 and 414 of the plate 402 and is longer than the first two segments, and a fourth segment 434d that is the longest segment and is parallel to the side edges 412 and 414 of the plate 402. Therefore, the first 434a and fourth 434d segments may be parallel to each other, and the third segment 434c may be perpendicular to the first 434a and fourth 434d segments. Additionally, the segments may get gradually closer to the side edge 412 or 414. More specifically, the first segment 434a may be the segment that is closest to the middle of the plate 402 and, therefore, furthest from the side edge 412 or 414, while the fourth segment 434d may be the segment that is closest to the side edge 412 or 414 and, therefore, furthest from the middle of the plate 402, as illustrated in FIG. 8. The second 434b and third 434c segments fall in between the first 434a and fourth 434d segments.

As mentioned above, the linear pattern 434 can connect on a first end to the connector electrode 430 and feed-thru pin 432 and on the other end to a wire opening 437. More specifically, the first segment 434a can connect on one end to the collector electrode 430 and feed-thru pin 432 and on the other end to the second segment 434b. The fourth segment 434d can connect on one end to a wire opening 437 and on the other end to the third segment 434c. The second segment 434b and third segment 434c can connect on their other ends to each other. While the linear pattern 434 of the electron collecting electrode pattern 428 is described above as composed of several segments/portions, it is not required to be several segments and can, instead, be a single, linear or curved pattern (instead of a plurality of segments) having two ends, wherein a first end connects to the connector electrode 430 and feed-thru pin 432, and a second end connects to the wire opening 437.

While one of the wire openings 437 can connect to the linear pattern 434, it can also connect to the wire 436. More specifically, the suspended wire 436 can be comprised of a single piece of thin wire 436 (for example, between 0.01 inches and 0.05 inches) that connects on each end to a pair of openings 437 that are embedded in the PID sensor plate 402. This connection can take place via, for example, soldering in order to keep the wire 436 in place. While the wire 436 is described herein as a single wire, the wire 436 is considered herein to also include circumstances where it is comprised of a plurality of wires. The plurality of wires can be combined (i.e., twisted, braided, etc.) such that they create one, larger, wire. In other cases, they may each be attached to the wire openings 437 and adjacent to each other, but not intertwined and, therefore, are separate from each other. Alternatively, the plurality of wires may connect at various locations on the plate 402 such that there are separate wire pins for each wire and there is space between each wire.

The wire 436 can be parallel to the upper 408 and lower 410 edges of the plate 402 (and, therefore, perpendicular to the side edges 412 and 414) and can span the majority of the width of the plate 402, as illustrated in FIG. 7. The wire openings 437 can function as feed-through holes that enable the wire 436 to be embedded in the plate 402 and then soldered in place. More specifically, the wire openings 437 can be embedded in the upper half of the plate 402 (i.e., on the top face 404 and with both openings on an opposite half of the top face 404 compared to the electrodes/feed-thru pins of the negative electrical potential pattern 418, electron collecting electrode pattern 428, and grounded potential conductive pattern 438) and near to/along the side edges 412 and 414 (for example, nearer to the side edges 412 and 414 than any of the negative bias 420, collector 430, or grounded electrodes 440). While one of the wire openings 437 can connect to both the linear pattern 434 and the wire 436, thereby connecting the wire 436 to the linear pattern 434, the other of the wire openings 437 may connect only to the wire 436. The wire 436, as mentioned above, can be suspended above the face of the plate 402 and positioned over the opening(s) 416. Further, only the wire 436 (and not the wire openings 437) may be positioned near the opening(s) 416. As described in further detail below, the wire openings 437 can be separated from the opening by at least the grounded potential conductive pattern 438.

Grounded Potential Conductive Pattern

Generally, the grounded potential conductive pattern 438 can be an electrically conductive pattern that is held at electrical ground potential, can be located on a top 404 and a bottom surface 406 of the plate 402, as illustrated in FIGS. 7-8, and can be comprised of a plurality of linear portions/segments 444, 446, a UV blocking electrode 446b, a grounded electrode 440, and a feed-thru pin 442. In some embodiments, the linear portions/segments 444, 446 can connect to a grounded electrode 440 and feed-thru pin 442. The grounded electrode 440 and feed-thru pin 442 can be located between the collector electrode 430 and the negative bias electrode 420 on the sensor plate 402 (for example, a lower middle portion, as illustrated in FIGS. 7-8). The grounded potential conductive pattern 438 can be comprised of a metal such as, but not limited to, copper, nickel, chromium, titanium, gold, silver, platinum, and stainless steels.

The plurality of linear portions/segments 424 of the negative electrical potential pattern 418 can be comprised of three portions (although the number of portions/segments may be greater or fewer). The first linear portion 424a of the plurality of linear portions/segments 424 may be parallel to the two opposing edges of the plate 402 (for example, the side edges 412 and 414). The second linear portion 424b may be at an angle (for example, between 30 degrees and 60 degrees, such as 45 degrees). The third linear portion 424c may be parallel to the two opposing edges of the plate 402 (for example, the side edges 412 and 414). Therefore, the first 424a and third 424c segments may be parallel to each other. Additionally, the third segment 424c may be closer to the middle of the plate 402 and, therefore, further from side edge 414 than first segment 424a is, as illustrated in FIG. 7.

As mentioned above, the grounded potential conductive pattern 438 can be comprised of a first portion 444 deposited on a first surface (for example, the top surface 404) of the plate 402 and a second portion 446 deposited on an opposite surface (for example, the bottom surface 406) of the plate 402. Alternatively, the first portion 444 may be deposited on a bottom surface 406 of the plate 402 while the second portion 446 may be deposited on a top surface 404 of the plate 402. In yet another embodiment, both the first portion 444 and the second portion 446 may be deposited on the same surface of the plate 402 (for example, both on the top surface 404 or both on the bottom surface 406).

The first portion 444 can be interposed between the wire openings 437 and the remaining patterns and opening(s) 416 of the top surface 404 of the plate 402. More specifically, a first end of the grounded potential conductive pattern 438 can connect to the grounded electrode 440, which can be located between the collector electrode 430 and the negative bias electrode 420. The grounded potential conductive pattern 438 can then wrap around the at least one opening 416 in the plate 402, the polarization plate 426, and a portion of the negative electrical potential pattern 418, such that the wire openings 437 are positioned on an opposite side (for example, an outer side) of the grounded potential conductive pattern 438 than these other components (which can be, for example, on an inner side). The second end of the grounded potential conductive pattern 438 can terminate near a side edge. For example, the grounded potential conductive pattern 438 can terminate near the side edge 414 that is nearest to the negative electrical potential pattern 418, thus surrounding the polarization plate 426 and a portion of the linear portions/segments 424 of the negative electrical potential pattern 418 and preventing cross-over of the grounded potential conductive pattern 438 and the negative electrical potential pattern 418.

As with the negative electrical potential pattern 418 and the electron collecting electrode pattern 428, the first portion 444 of the grounded potential conductive pattern 438 can be comprised of a plurality of linear portions/segments. While six segments are illustrated in FIG. 7, there may be fewer or more segments in the first portion 444 of the grounded potential conductive pattern 438 than six. For example, the first portion 444 may be a single, curved pattern (instead of a plurality of segments) having two ends, wherein a first end connects to the grounded electrode 440 and feed-thru pin 442, and a second end terminates near a side edge 414.

In embodiments of the first portion 444 having a plurality of segments, a first segment 444a can connect on a first end to the grounded electrode 440 and feed-thru pin 442 and can connect on a second end to a second segment 444b. The first segment 444a can be approximately parallel to the side edges 412 and 414 and can be approximately centered between the side edges 412 and 414.

The second segment 444b can be at an angle away from the negative bias electrode 420 (for example, between 30 degrees and 60 degrees, such as 45 degrees) and can connect to a third segment 444c. In some embodiments, the first segment and the second segment can be combined into a single segment that connects on a first end to the grounded electrode 440 and feed-thru pin 442 and connects on a second end to the next segment. In those embodiments, the combined first and segments can be at an angle away from the negative bias electrode 420 (for example, between 30 degrees and 60 degrees, such as 45 degrees).

The third segment 444c can connect on a first end to the second segment 444b (or as mentioned above, the combined first and second segments), can be parallel to the side edges 412 and 414 of the plate 402, can span from a position closer to the lower edge 410 of the plate 402 than the polarization plate 426 to a position closer to the upper edge 408 than the opening(s) 416 in the plate 402, and can connect on a second end to the fourth segment 444d. Therefore, the third segment 444c can completely interpose between the side edge 412 or 414 and the polarization plate 426 and the opening(s) 416. As such, the opening(s) 416 and polarization plate 426 can be positioned interior to the third segment 444c (i.e., closer to the middle of the plate 402) whereas a wire opening 437 is positioned exterior to the third segment 444c (i.e., closer to an edge 412 or 414 of the plate 402).

A fourth segment 444d can connect on a first end to the third segment 444c and on a second end to the fifth segment 444e. The fourth segment 444d can be parallel to the upper 408 and lower 410 edges of the plate 402. The fourth segment 444d can be longer than both the polarization plate 426 and the opening(s) 416 (as measured along an axis spanning side edge 412 to side edge 414). The fourth segment 444d can also be shorter than the length of the suspended wire 436 of the electron collecting electrode pattern 428 (as measured along the axis spanning side edge 412 to side edge 414). The fourth segment 444d can be positioned and deposited between the opening(s) 416 and the upper edge 408 of the plate 402. Therefore, the opening(s) 416 can be positioned between the polarization plate 426 and the fourth segment 444d, and all three components can be parallel to each other and to the upper 408 and lower 410 edges of the plate 402.

A fifth segment 444e can mirror the third segment 444c on the opposite end of the polarization plate 426 and the opening(s) 416 such that it is parallel to the side edges 412 and 414 of the plate 402, has a first, upper end closer to the upper edge 408 than the opening(s) 416 in the plate 402, and a second, lower end closer to the lower edge 410 of the plate 402 than the polarization plate 426. As mentioned above, the fifth segment 444e can connect on its upper end to one end of the fourth segment 444d. The fifth segment 444e can connect on its lower end to the sixth segment 444f. As with the third segment 444c, the opening(s) 416 and polarization plate 426 can be positioned interior to the fifth segment 444e (i.e., closer to the middle of the plate 402) whereas a wire opening 437 can be positioned exterior to the fifth segment 444e (i.e., closer to an edge 412 or 414 of the plate 402). The first segment 444a, third segment 444c, and fifth segment 444e can all be parallel to each other. As illustrated in FIG. 7, the first 444a and fifth 444e segments may be nearer side edges 412 and 414 than the third segment 444c.

A final, sixth segment 444f can be parallel to the upper 408 and lower 410 edges of the plate 402, can connect on a first end to the fifth segment 444e, and can terminate on a second end near a side edge 412 or 414 of the plate 402. The termination point of the sixth segment 444f can be closer to the side edge 412 or 414 than the wire opening 437. The sixth segment 444f can also be parallel to the fourth segment 444d, the opening(s) 416, the polarization plate 426, and the wire 436, and the opening(s) 416, polarization plate 426, and wire 436 can be positioned between the fourth segment 444d and the sixth segment 444f.

As illustrated in FIG. 7, the negative electrical potential pattern 418 can be completely separated from the wire openings 437 by the grounded potential conductive pattern 438. Further, the negative electrical potential pattern 418 can be blocked from the effects of the wire 436 itself by the polarization plate 426, which is located nearer the lower edge 410 (and the negative electrical potential pattern 418) than the opening(s) 416 over which the wire 436 is suspended. Additionally, this first portion 444 of the grounded potential conductive pattern 438 can separate the collector electrode 430 from the negative electrical potential pattern 418, which helps to minimize surface conduction effects. Surface conduction effects can be further reduced based on the material of the plate 402 (for example, a hydrophilic material such as polytetrafluoroethylene).

As mentioned above, the grounded potential conductive pattern 438 can have a second portion 446 located on an opposite surface (for example, a bottom surface 406) of the PID sensor plate 402. The second portion 446 of the grounded potential conductive pattern 438 can also be comprised of a plurality of linear portions/segments. While five segments are illustrated in FIG. 8, there may be fewer or more segments in the second portion 446 of the grounded potential conductive pattern 438 than five. For example, the second portion 446 may be a single, curved pattern (instead of a plurality of segments) having two ends, wherein a first end connects to the grounded electrode 440 and feed-thru pin 442, and a second end terminates on a portion of the pattern.

In embodiments of the second portion 446 having a plurality of segments, a first segment 446a can connect on a first end to the grounded electrode 440 and on a second end to a second segment 446b (for example, at a middle portion of the second segment 446b). The first segment 446a can be parallel to the side edges 412 and 414 of the plate 402 and can be approximately centered between the side edges 412 and 414.

The second segment 446b can be perpendicular to the first segment 446a, can be on an upper half of the plate 402, can be centered between the side edges 412 and 414, and may connect on a first end to the third segment 446c and on a second end to the fourth segment 446d. In some embodiments, the second segment 446b may be a UV blocking electrode. Further, the second segment 446b may be longer than the opening(s) 416 in the plate 402 such that its first end is closer to one side 412 or 414 of the plate 402 than the opening(s) 416 and its second end is closer to the opposite side 412 or 414 of the plate 402 than the opening(s) 416. However, as illustrated in FIG. 8, the second segment 446*b* may not extend out to the location of the wire openings 437; its ends may terminate at points just past the ends of the opening(s) 416. As illustrated in FIG. 8, the second segment 446*b* may be the widest segment of the second portion 446.

The third segment 446*c* and fourth segment 446*d* may be mirrors of each other, may both be parallel to the side edges 412 and 414 of the plate 402, and may connect, on their first ends, to the ends of the second segment 446*b* and, on their second ends, to the ends of a fifth segment 446*e*. The upper ends of the third 446*c* and fourth 446*d* segments may terminate at a position closer to the upper edge 408 of the plate 402 than the opening(s) 416. Therefore, the opening(s) 416 can be positioned interior to the third segment 446*c* (i.e., closer to the middle of the plate 402) whereas a wire opening 437 can be positioned exterior to the third segment 446*c* (i.e., closer to an edge 412 or 414 of the plate 402). Similarly, the opening(s) 416 can be positioned interior to the fourth segment 446*d* (i.e., closer to the middle of the plate 402) whereas a wire opening 437 can be positioned exterior to the fourth segment 446*d* (i.e., closer to an edge 412 or 414 of the plate 402).

The fifth segment 446*e* may mirror the second segment 446*b* in that it is parallel to the upper 408 and lower 410 edges of the plate 402 and has a similar width to the second segment 446*b*. As mentioned above, the fifth segment 446*e* can connect on a first end to the third segment 446*c* and on a second end to the fourth segment 446*d*.

Therefore, a portion (i.e., the second 446*b*, third 446*c*, fourth 446*d*, and fifth 446*e* segments) of the second portion 446 of the grounded potential conductive pattern 438 may surround the opening(s) 416 in the form of a rectangular box, thereby being interposed between the opening(s) 416 and the linear pattern 434 of the electron collecting electrode pattern 428 as well as being interposed between the opening(s) 416 and the wire openings 437, and the first segment 446*a* can connect the box to the grounded electrode 440 and feed-thru pin 442, which can be located between the collector electrode 430 and the negative bias electrode 420. While the second segment 446*b* can be a UV blocking electrode, the third 446*c*, fourth 446*d* and fifth 446*e* segments can serve as an additional guard tracing around the at least one opening 416. This pattern 438 can align with and block UV light from passing through the opening(s) 416 and reaching the negative electrical potential pattern 418 in order to (1) prevent photoelectric electrons from being generated and (2) minimize or eliminate any false background signals due to photoelectric electrons.

In some embodiments, the first portion 444 of the grounded potential conductive pattern 438 can substantially align with the second portion 446 of the grounded potential conductive pattern 438. More specifically, the third 444*c*, fourth 444*d*, and fifth 444*e* segments of the first portion 444 of the grounded potential conductive pattern 438 can sufficiently align with the third 446*c*, fourth 446*d*, and fifth 446*e* segments of the second portion 446 of the grounded potential conductive pattern 438. Further, the polarization plate 426 of the negative electrical potential pattern 418 can substantially align with the second segment 446*b* (i.e., the UV blocking electrode) of the second portion 446 of the grounded potential conductive pattern 438.

Feed-Thru Pins and Pattern Positioning/Location

Except as otherwise mentioned herein, the feed-thru pins in the PID Sensor of Embodiment 2 400 share the same features as the PID Sensor 300 of Embodiment 1. For example, a feed-thru pin can be present for each of the electrodes (negative bias 420, positive collector 430, and grounded 440), and these corresponding feed-thru pins 422, 432, 442 can be electrically connected to their corresponding patterns 418, 428, 438.

As mentioned briefly above, the patterns can be on similar or opposing surfaces of the plate 402. In one embodiment, a first surface of the plate 402 (for example, the top surface 404) can include the negative electrical potential pattern 418, the polarization plate 426, the wire 436 portion of the electron collecting electrode pattern 428, and a first portion 444 of the grounded potential conductive pattern 438, as illustrated in FIG. 7, and the second surface of the plate 402 (for example, the bottom surface 406) can include the linear pattern 434 of the electron collecting electrode pattern 428 and the second portion 446 of the grounded potential conductive pattern 438, as illustrated in FIG. 8.

However, this arrangement is not required. In other embodiments, the wire 436 portion of the electron collecting electrode pattern 428 can be on the same side as the linear pattern 434 of the electron collecting electrode pattern 428, or the grounded potential conductive pattern 438 may be limited to only a single surface (i.e., either the top 404 or the bottom surface 406). And in some embodiments, all three patterns 418, 428, 438 can be located on the same side of the plate 402 (for example, the top 404 or bottom 406).

As with Embodiment 1 of PID Sensor 300, in addition to relative location of the patterns of Embodiment 2 to each other, there may be designated placement of the patterns relative to other patterns or feed-thru pins. For example, as illustrated in FIGS. 6-7 and mentioned above, the grounded potential conductive pattern 438 can be interposed, on a top surface 404, between the two wire openings 437 and the negative electrical potential pattern 418, on the top surface 404, between the negative electrical potential pattern 418 and the electron collecting electrode 430 and feed-thru pin 432, on a bottom surface 406, between the electron collecting electrode 430 and feed-thru pin 432 and the negative bias electrode 420 and feed-thru pin 422, and on the bottom surface 406, between the at least one opening 416 and the electron collecting electrode 430 and feed-thru pin 432. However, as with the location of the patterns, their location relative to each other may vary.

PID Sensor Plate

Generally, the PID sensor plate 402 may be rectangular, have a top surface 404, a bottom surface 406, an upper edge 408, a lower edge 410, and two side edges 412 and 414. The top 404 and bottom 406 surfaces may be the portions of the plate 402 upon which the negative electrical potential pattern 418, the electron collecting electrode 430, and the grounded potential conductive pattern 438 can be deposited. As mentioned above, the plate 402 can include at least one opening 416 and can be comprised of an electrically insulating substrate (for example, polytetrafluoroethylene). The feed-thru pins 422, 432, 442 may be positioned between the top 404 and bottom 406 surfaces and near the lower edge 410 and can allow for electrical connections to the patterns on the plate 402. Depending on the type of feed-thru pin and electrode (i.e., negative bias 420/422, positive 430/432, or grounded 440/442), the feed-thru pin and electrode may be nearer to one side edge 412 or 414 than another. Alternatively, they may be centered between the two side edges 412 and 414.

The at least one opening 416 of the PID sensor plate 402 may be one single opening, as illustrated in FIGS. 7-8, or it may be a plurality of openings. The single opening 416 can be approximately ovular in shape and may be approximately parallel to the upper 408 and lower 410 edges of the plate 402. The opening 416 can be centered between the two wire openings 437 (and correspondingly centered between the two side edges 412 and 414 of the plate 402) such that an equal amount of opening 416 is located on either side of the wire 436. Therefore, the opening 416 may be nearer to the upper edge 408 of the plate 402 than to the lower edge 410 of the plate 402. Further, the opening 416 may have a similar, or smaller, width compared to the polarization plate 426. In embodiments where the opening(s) 416 is a plurality of openings, the plurality of openings may continue to create an approximately overall shaped oval opening. For example, each opening may be circular (or oval) and the combination of openings may create a larger oval, similar to how the plurality of circular openings in FIGS. 3-4 create a larger circle.

FIGS. 9 and 10 illustrate how the electric field is concentrated around the wire 436 and edges of the polarization plate 426 of the negative electrical potential pattern 418. As illustrated, a high electric field is created where the UV light is present and where VOC gas is introduced. This addresses high gain, linearity, and time response aspects of the PID design. Humidity sensitivity can also be reduced due to the air gap of the large opening 416 and the long distances between the polarization plate 426 and the components of the electron collecting electrode pattern 428 (i.e., the wire 436 and wire openings 437). As illustrated, the grounded potential conductive pattern 438 can separate the electron collecting electrode pattern 428 (for example, the wire 436) from the negative electrical potential pattern 418 in order to minimize surface conduction effects.

As with Embodiment 1 of the PID Sensor 300, instead of being comprised of two material layers where the electrode patterns are deposited on the top, bottom, and in the middle, the plate 402 of PID Sensor 400 can be limited to a single, hydrophobic layer having patterns on (or suspended above, in the case of the wire 436) only the outer surfaces. More specifically, as described above, the negative electrical potential pattern 418 can be deposited on the top surface 404, the grounded potential conductive pattern 438 can be deposited on the top 404 and the bottom 406 surface, and the electron collecting electrode pattern 428 can have a linear pattern 434 deposited on the bottom surface 406 and a suspended wire 436 above the top surface 404. Other arrangements of the patterns on the top 404 and/or bottom 406 surfaces are described above.

Embodiment 2 of the PID Sensor 400 therefore incorporates several features that improve its VOC gas detection function. The opening 416, which can be large compared to prior art openings, allows UV light to reach VOC gas introduced above the detector and improves time response. The polarization plate 426 of the negative electrical potential pattern 418 can be spaced near a wire 436 suspended above it. The combination of the wire 436, which can have a small diameter, and the sharp edges of the polarization plate 426 can increase the electric field in its immediate vicinity. Also similar to Embodiment 1 of the PID Sensor 300, while Embodiment 2 of the PID Sensor 400 can include combinations of the above features, the embodiments themselves can vary while still improving signal-to-noise performance and maximizing gaps and distances between all electrodes such that they have minimal shared contact areas and allow for a more accurate and sensitive detector that is capable of use in more extreme (i.e., humid) environments.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A planar photoionization detector, the photoionization detector comprising:
   a gas discharge lamp that ionizes molecules of interest to create ionized molecules and electrons; and
   a sensor comprised of
      at least a plate, the plate comprising a top surface, a bottom surface, an electrically insulating substrate, and at least one opening for UV light to pass through, and
      electrically conductive patterns on at least one of the top and bottom surfaces, including at least a negative electrical potential pattern and an electron collecting electrode pattern,
   wherein
      the electron collecting electrode pattern includes a wire suspended across the at least one opening.

2. The planar photoionization detector of claim 1, wherein the electrically conductive patterns further include at least one electrically conductive pattern that is held at electrical ground potential.

3. The planar photoionization detector of claim 2, further comprising a feed-thru pin that is electrically connected to the electron collecting electrode pattern, wherein
   the grounded potential conductive pattern is located on the same plate surface as the negative electrical potential pattern, and
   the grounded potential conductive pattern is interposed between the negative electrical potential pattern and the electron collecting electrode pattern and feed-thru pin.

4. The planar photoionization detector of claim 3, further comprising a second grounded potential conductive pattern on an opposite surface as the grounded potential conductive pattern, wherein the second grounded potential conductive pattern is interposed between the electron collecting electrode pattern and a feed-thru pin that is electrically connected to the negative electrical potential pattern.

5. The planar photoionization detector of claim 4, wherein the second grounded potential conductive pattern surrounds the at least one opening.

6. The planar photoionization detector of claim 2, wherein the grounded potential conductive pattern includes a first portion located on the same plate surface as the negative electrical potential pattern and a second portion located on an opposite plate surface than the negative electrical potential pattern, and
   a portion of the second portion of the grounded potential conductive pattern surrounds the at least one opening.

7. The planar photoionization detector of claim 6, wherein the negative electrical potential pattern includes a polarization plate, and
   the portion of the second portion of the grounded potential conductive pattern that surrounds the at least one opening aligns with the polarization plate and a portion of the first portion of the grounded potential conductive pattern.

8. The planar photoionization detector of claim 1, wherein the negative electrical potential pattern is on one of the top or the bottom surface.

9. The planar photoionization detector of claim 8, wherein the negative electrical potential pattern includes a polarization plate.

10. The planar photoionization detector of claim 9, wherein the polarization plate runs adjacent to, and along, a length of the at least one opening.

11. The planar photoionization detector of claim 1, wherein
the electron collecting electrode pattern includes a linear pattern on one of the top or the bottom surface of the plate, and
the wire suspended across the at least one opening is on the other of the top or the bottom surface.

12. The planar photoionization detector of claim 11, wherein
the electrically conductive patterns further include at least one electrically conductive pattern that is held at electrical ground potential, and
the grounded potential conductive pattern is interposed between the linear pattern of the electron collecting electrode pattern and the at least one opening.

13. The planar photoionization detector of claim 11, wherein
the wire connects on a first end to a first opening near a first side of the plate,
the wire connects on a second end to a second opening near a second side of the plate, and
the second opening also connects to an end of the linear pattern of the electron collecting electrode pattern, thereby connecting the wire to the linear pattern.

14. The planar photoionization detector of claim 11, wherein the wire is comprised of a plurality of wires.

15. The planar photoionization detector of claim 1, wherein the at least one opening is a single opening.

16. The planar photoionization detector of claim 1, wherein the at least one opening is comprised of multiple openings.

17. The planar photoionization detector of claim 1, wherein the electrically insulating substrate is polytetrafluoroethylene.

18. The planar photoionization detector of claim 1, wherein the plate is a single, hydrophobic layer having
the negative electrical potential pattern deposited on the top surface,
a grounded potential conductive pattern deposited on the top surface and the bottom surface, and
the electron collecting electrode pattern deposited on the bottom surface and including a suspended wire on the top surface.

19. A planar photoionization detector sensor comprising
a plate having a top surface and a bottom surface and being comprised of an electrically insulating substrate,
an opening for UV light to pass through,
a negative electrical potential pattern including a linear portion and a polarization plate,
an electron collecting electrode pattern including a wire suspended across the opening, and
a grounded potential conductive pattern having a first portion on the top surface and a second portion on the bottom surface,
wherein
the polarization plate runs adjacent to, and along, a length of the opening,
the grounded potential conductive pattern is interposed between the negative electrical potential pattern and an electron collecting electrode feed-thru pin,
the wire connects on its ends to openings located on either end of the opening,
the grounded potential conductive pattern is interposed between the wire openings and the opening,
the second portion of the grounded potential conductive pattern surrounds the opening,
a lower portion of the second portion of the grounded potential conductive pattern is a UV blocking electrode that runs adjacent to, and along, a length of the opening, and
the polarization plate on the top surface approximately aligns with the UV blocking electrode on the bottom surface.

20. A planar photoionization detector sensor comprising
a plate having a top surface and a bottom surface and being comprised of an electrically insulating substrate,
at least one opening for UV light to pass through,
a negative electrical potential pattern on one of the top or the bottom surface, and
an electron collecting electrode pattern having a wire suspended across the at least one opening, wherein the wire is suspended across the same plate surface that the negative electrical potential pattern is located on.

* * * * *